United States Patent
Roe

[11] 3,830,579
[45] Aug. 20, 1974

[54] COUPLINGS

[75] Inventor: Donald Cyril Roe, London, England

[73] Assignee: The Amalgamated Dental Company Limited, London, England

[22] Filed: Oct. 29, 1973

[21] Appl. No.: 410,387

[30] Foreign Application Priority Data
July 10, 1973 Great Britain .................. 32733/73

[52] U.S. Cl. .................. 403/24, 403/325, 403/328, 32/26
[51] Int. Cl. ............................. F16b 7/00
[58] Field of Search ............ 403/325, 328, 324, 24; 285/317; 279/76, 89, 79, 80, 1 B; 32/26, 27

[56] References Cited
UNITED STATES PATENTS
3,432,194  3/1969  Garnier .............................. 403/325
3,604,735  9/1971  Hoffmeister ...................... 403/317

Primary Examiner—Andrew V. Kundrat

[57] ABSTRACT

A slip-sleeve coupling for connecting a dental handpiece to an electric micro motor comprises a centrally apertured disc connected to a coaxially tubular sleeve provided with a radially movable latch means on the outer surface thereof for engagement with a dental handpiece, the said latch being mounted on a generally cylindrical member within said sleeve and said disc and projecting through an aperture in said sleeve, said cylindrical member being resiliently biased towards the position at which the latch means projects from the outer surface of the tubular sleeve and said tubular member being further provided with an operating member projecting radially outwardly beyond the periphery of the said disc and through a recess therein for moving the cylindrical member against the action of said resiliently biasing means to depress said latch below the surface of said tubular sleeve, thereby to release any handpiece engaged therewith. The biasing means for the cylindrical member suitably comprises a helical spring mounted within a recess in said disc diametrically opposite said operating member. The invention also provides a dental assembly comprising a micro motor provided with a slip-sleeve coupling as defined above.

3 Claims, 3 Drawing Figures

PATENTED AUG 20 1974   3,880,579

COUPLINGS

This invention is concerned with improvements in and relating to couplings for connecting straight or angled dental handpieces to miniature electric drive motors (micro motors) and is particularly concerned with a form of coupling commonly known as a "slip-sleeve" coupling.

Broadly speaking, couplings of the "slip-sleeve" type are adapted to be attached to the drive end of a micro motor and generally comprise a disc-shaped portion (which is to be attached to the drive end of the motor) and a tubular sleeve, the drive from the motor passing through a central aperture in the disc and through the tubular sleeve. Dental handpieces are connected to the drive motor by being slipped over the tubular sleeve and attached thereto in a rotatable manner.

According to the present invention there is provided a slip-sleeve coupling for connecting a dental handpiece to an electric micro motor comprising a centrally apertured disc connected to a coaxially tubular sleeve provided with radially moveable latch means on the outer surface thereof for engagement with a dental handpiece, the said latch means being mounted on a generally cylindrical member within said sleeve and said disc and projecting through an aperture in said sleeve, said cylindrical member being resiliently biased towards the position at which the latch means projects from the outer surface of the tubular sleeve (for example by means of a helical spring within a recess in said disc) and said tubular member being further provided with an operating member projecting radially outwardly beyond the periphery of the said disc and through a recess therein for moving the cylindrical member against the action of said resilient biasing means to depress said latch below the surface of said tubular sleeve, thereby to release any handpiece engaged therewith.

In accordance with another embodiment of the invention there is provided a micro motor assembly having connected thereto a coupling element in accordance with the invention.

In order that the invention may be well understood reference will now be made to the accompanying drawings in which FIG. 1 is an axial section through a coupling in accordance with the invention;

Figure 1:
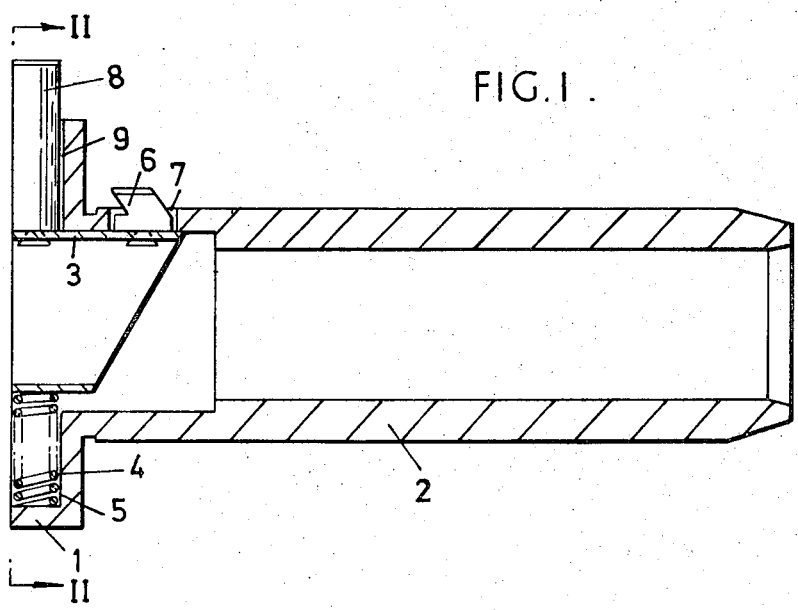
Figure 2:
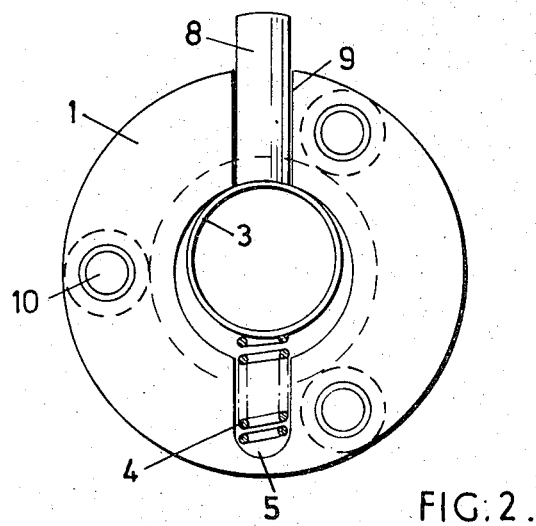
FIG. 2 is a view on line 2—2 FIG. 1.

Referring now to FIG. 1 and FIG. 2 of the accompanying drawings a coupling member in accordance with the present invention comprises a perforated disc member formed integrally with a tubular sleeve 2. Mounted within disc 1 and tubular sleeve 2 is generally cylindrical member 3 which is urged upwards (as seen in the drawings) under the action of coil spring 4 mounted within recess 5 in disc 1. Cylindrical member 3 bears on its upper surface, latch member 6 passing through aperture 7 in sleeve 2 and at, the other end thereof, plunger 8 extending radially beyond the periphery of disc 1 and sliding groove 9 therein.

Figure 3:
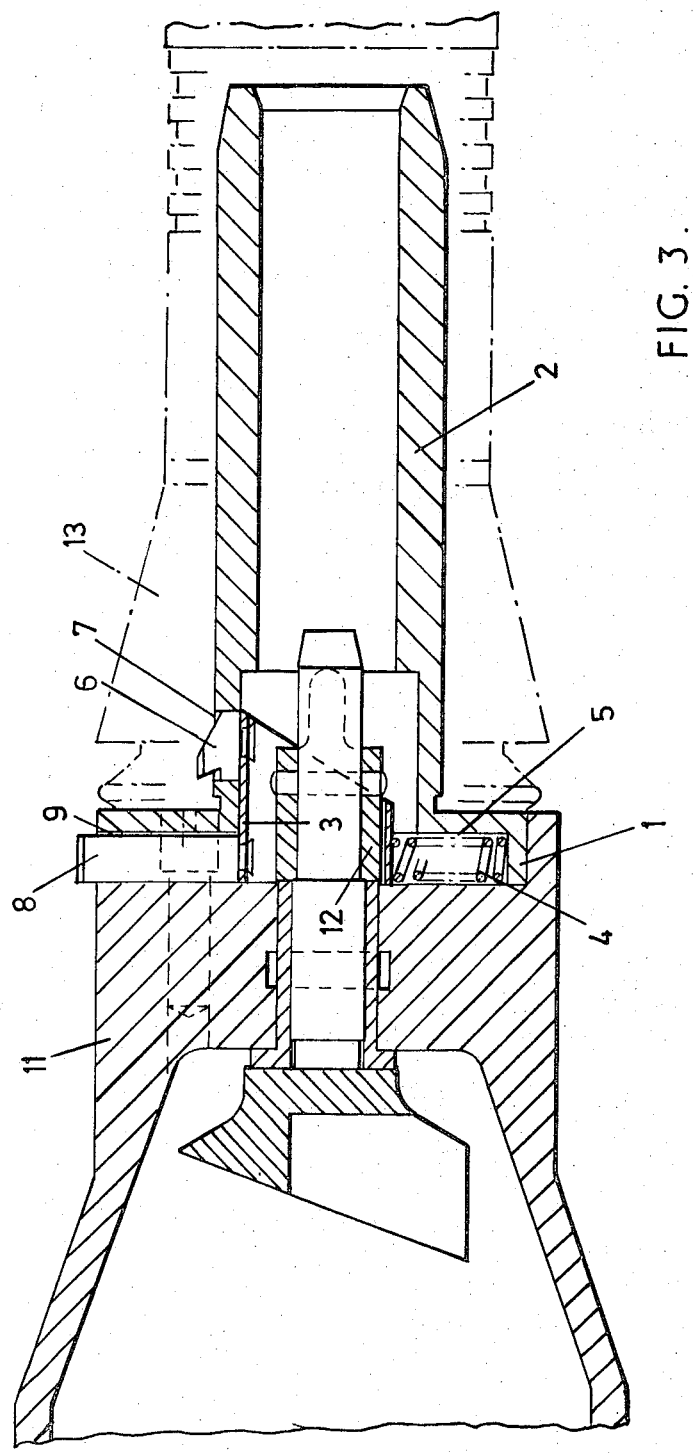
FIG. 3 is a partial view, shown in section, of a coupling in accordance with the invention attached to a micro motor assembly and engaging with a dental handpiece.

Cylindrical member 3 has a part thereof cutaway in order to facilitate its introduction into disc 1 and sleeve 2. Disc 1 is also provided with drill holes 10 through which pass screws to attach it to the body 11 of a micro motor assembly (see FIG. 3) having a drive shaft assembly 12 which projects into the interior of the sleeve assembly 1/2 and passes through cylindrical member 3 to engage with suitable means in a dental handpiece 13 slipped over the outside surface of sleeve 2 and held in position by latch 6 engaging in an annular groove wherein.

In operation latch 6 is depressed to make possible release of handpiece 13 by pressing down the plunger.

I claim:

1. A slip-sleeve coupling for connecting a dental handpiece to an electric micro motor comprising a centrally apertured disc having a coaxially tubular sleeve portion and provided with a radially movable latch means adjacent the outer surface thereof for engagement with a dental handpiece, the said latch means being mounted on a generally cylindrical member within said sleeve and said disc and projecting through an aperture in said tubular sleeve portion, said cylindrical member being resiliently biased by a biasing means towards the position at which the latch means projects from the outer surface of the tubular sleeve, and said cylindrical member being further provided with an operating member projecting radially outwardly beyond the periphery of the said disc and through a recess therein for moving the cylindrical member against the action of said biasing means to depress said latch below the surface of said tubular sleeve, thereby to release any handpiece engaged therewith.

2. A slip-sleeve coupling as claimed in claim 1 in which the biasing means for the cylindrical member comprises a helical spring mounted within a recess in said disc diametrically opposite said operating member.

3. A dental assembly comprising a micro motor provided with a slip-sleeve coupling comprising a centrally apertured disc having a coaxially extending tubular sleeve provided with a radially movable latch means adjacent the outer surface thereof for engagement with a dental handpiece, the said latch means being mounted on a generally cylindrical member within said sleeve and said disc and projecting through an aperture in said sleeve, said cylindrical member being resiliently biased by a biasing means towards the position at which the latch means projects from the outer surface of the tubular sleeve and said tubular member being further provided with an operating member extending from said cylindrical member and projecting radially outwardly beyond the periphery of the said disc and through a recess therein for moving the cylindrical member against the action of said resiliently biasing means to depress said latch below the surface of said tubular sleeve, thereby to release any handpiece engaged therewith.

* * * * *